April 7, 1942.  C. H. DESAUTELS  2,278,533
APPARATUS FOR WRAPPING BEAD WIRES
Filed Feb. 12, 1941  3 Sheets-Sheet 1
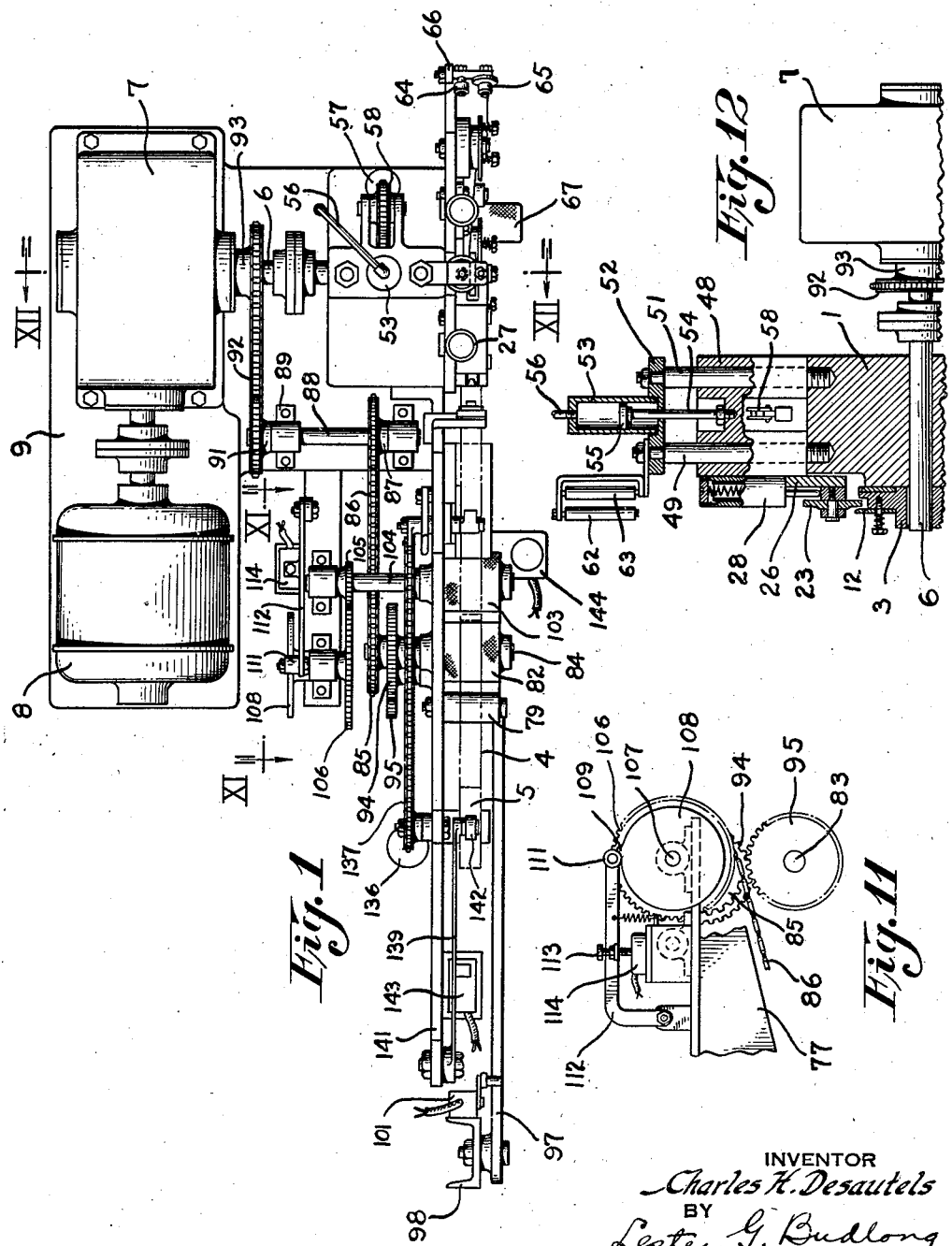
INVENTOR
Charles H. Desautels
BY
Lester G. Budlong
ATTORNEY April 7, 1942. C. H. DESAUTELS 2,278,533
APPARATUS FOR WRAPPING BEAD WIRES
Filed Feb. 12, 1941 3 Sheets-Sheet 2
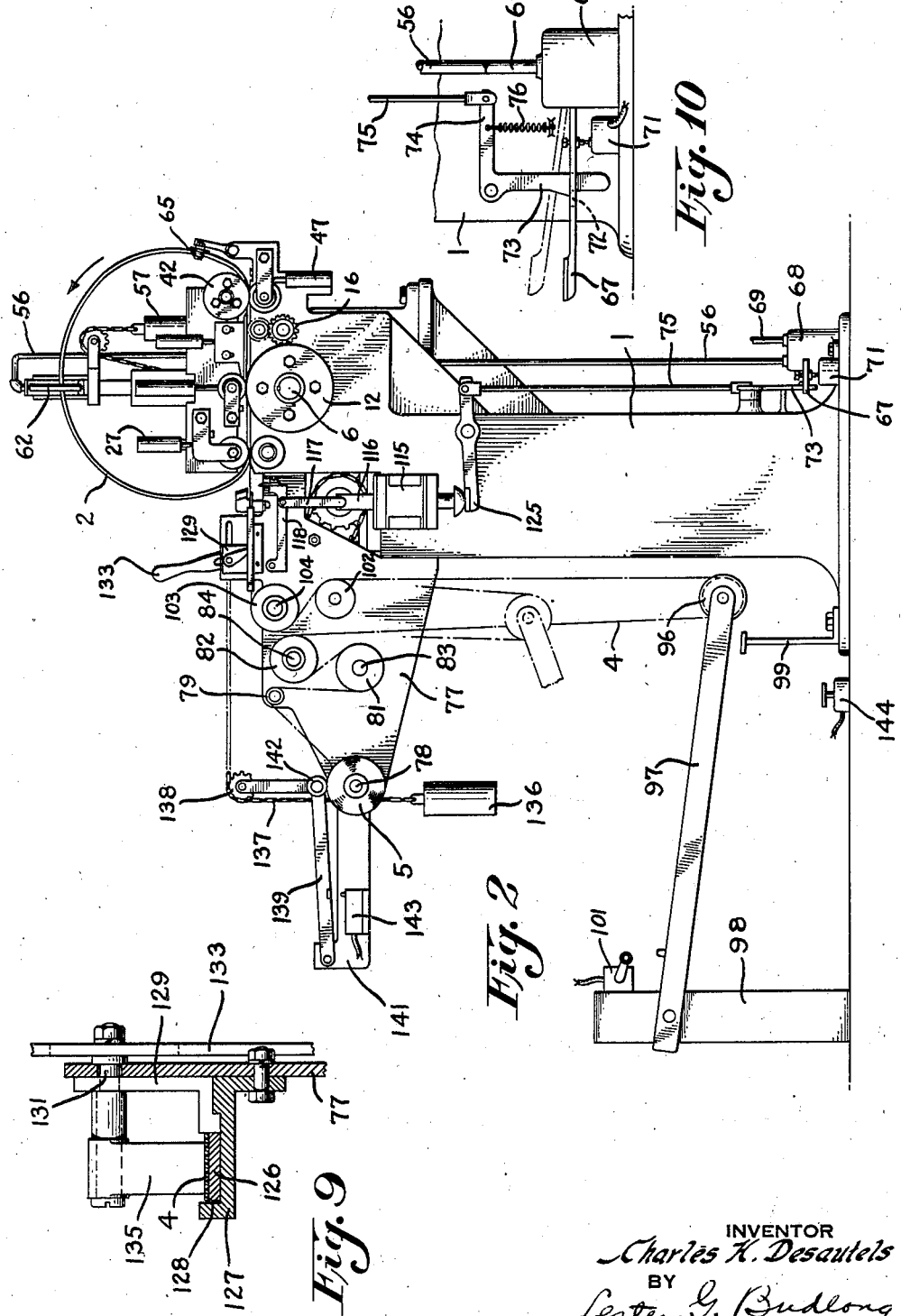
INVENTOR
Charles H. Desautels
BY
Lester G. Budlong
ATTORNEY

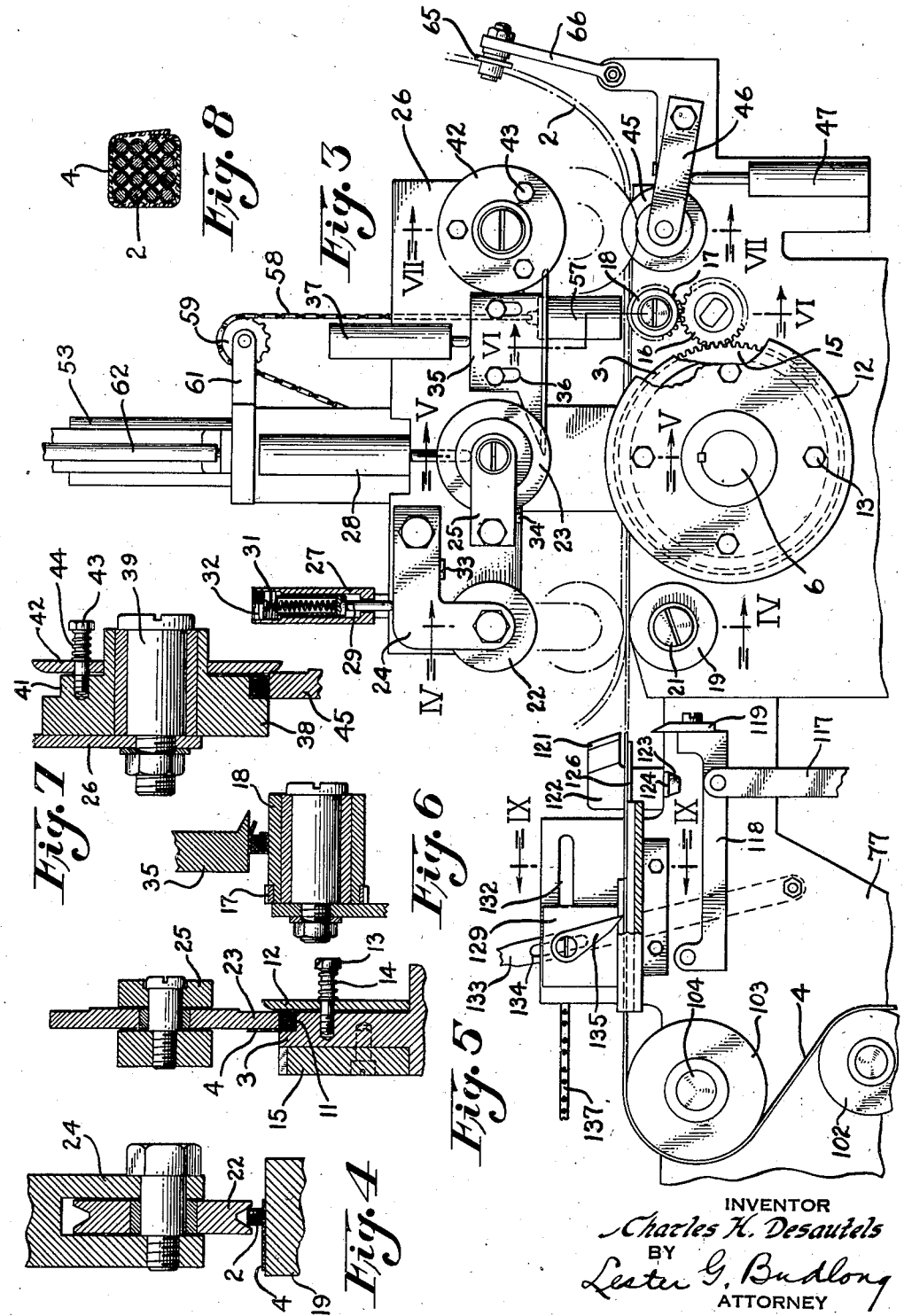

Patented Apr. 7, 1942

2,278,533

UNITED STATES PATENT OFFICE 2,278,533

APPARATUS FOR WRAPPING BEAD WIRES

Charles H. Desautels, Springfield, Mass., assignor to United States Rubber Company, New York, N. Y., a corporation of New Jersey Application February 12, 1941, Serial No. 378,595

15 Claims. (Cl. 154—9.1)

This invention relates to an apparatus for wrapping bead wires used in the manufacture of pneumatic tires and, more particularly, it relates to an automatic mechanism for applying a measured length of a circumferential strip of rubberized fabric to the outer periphery of a bead wire and folding the marginal portions of the strip laterally around the bead wire.

In wrapping bead wires for pneumatic tires, it has been customary to wrap the wires in a semi-automatic operation. Conventional devices used for this operation usually required the operator to stop the machine during the wrapping cycle and cut the fabric strip material by hand-operated scissors; thereafter the machine was restarted to complete the cycle of operation. The conventional method has, therefore, been slow and has resulted in a non-uniform product, particularly since the strip material applied to the bead wire was cut by the operator to a length approximating the desired over-lap.

In the practice of my invention, I provide an automatic apparatus for wrapping tire beads in which the operator is merely required to place the bead wire in a support provided by the machine, advance the leading edge of the strip material into engagement with the bead wire, and set the machine in operation. Thereafter the wrapping is performed entirely automatically, the strip of fabric is auomatically cut to the desired length, and the machine returned to its original position to complete a cycle of operation. It is, therefore, among the objects of my invention to provide an apparatus for wrapping tire beads in which the wrapping is accomplished automatically, and in which the strip material is measured to a proper length and severed, resulting in a minimum amount of hand operation, permitting a cycle of operation to be completed in a shorter period, and providing a more uniform product. These and other objects and advantages will appear more fully in the following detailed description when considered in connection with the accompanying drawings, in which:

Fig. 1 is a plan view of a tire bead wrapping machine;

Fig. 2 is a side elevational view thereof;

Fig. 3 is an enlarged elevational view of a portion of the wrapping mechanism illustrated in Fig. 2;

Fig. 4 is a transverse view, in section, of a wrapping operation as taken along lines IV—IV of Fig. 3;

Fig. 5 is a transverse view, in section, of a wrapping operation as taken along lines V—V of Fig. 3;

Fig. 6 is a transverse view, in section, of a wrapping operation as taken along lines VI—VI of Fig. 3;

Fig. 7 is a transverse view, in section, of a wrapping operation as taken along lines VII—VII of Fig. 3;

Fig. 8 is an enlarged transverse view, in section, of a completely wrapped bead wire;

Fig. 9 is a transverse view, in section, of a strip advancing mechanism taken along lines IX—IX of Fig. 3;

Fig. 10 is an enlarged view, in detail, of a portion of the apparatus showing a side view of a foot pedal and associated mechanism;

Fig. 11 is a detail view of a measuring cam and associated mechanism, the view being taken along lines XI—XI of Fig. 1; and, Fig. 12 is a transverse view, partly in section, of a detail portion of the wrapping apparatus as viewed along lines XII—XII of Fig. 1.

With reference to the drawings and, in particular, to Fig. 2, I show one form of the invention which includes a frame 1 with which the various elements of the wrapping machine are associated. The principal support and drive for a tire bead 2 is a drive wheel 3 (Figs. 3 and 5) which engages the bead 2 and causes it to rotate circumferentially, while at the same time assisting in wrapping strip material 4 around the bead wire 2. The bead wire 2 refers generally to a plurality of strands of steel wire grouped together in a bundle, the wires coated individually or as a group with a rubber composition, similar to any of the various types of conventional bead wires. The fabric strip material 4 is usually provided in the form of a square woven fabric frictioned with a rubber composition on one or both sides and sometimes provided with an additional skim coating of rubber composition. The strip material 4 is provided in a width sufficient to extend transversely around the bead wire when applied thereto, with allowance for a small over-lap. The fabric strip material is supplied in the form of a roll of rubberized fabric 5 (Fig. 2).

The drive wheel 3 is keyed to a shaft 6 driven directly from a reduction unit 7 (Fig. 1) and motor 8 mounted on a bed plate 9 forming a part of the frame 1. The drive wheel 3 includes a recess 11 (Fig. 5) to accommodate the bead wire 2. Associated with the drive wheel 3 is an outer flange 12 connected to the drive wheel by means of machine screws 13 provided with springs 14 which exert a pressure against the flange 12 to cause the flange 12 to be positioned resiliently with respect to the transverse dimensions of the bead wire 2 as it lies within the recess 11. Also associated with the drive wheel 3 is a gear 15 (Fig. 3) which meshes with an idler gear 16 mounted on the frame 1 and which, in turn, meshes with a gear 17 for rotating an auxiliary drive wheel 18 and which assists in moving the bead wire in a circumferential path.

Preceding the drive wheel 3 is a positioning wheel 19 which rotates freely on a shaft 21 attached to the frame 1. Both the drive wheel 3 and the positioning roller 19 cooperate with means for contacting the inner periphery of the bead wire and for holding the bead wire firmly against the wheel 3 and roller 19. These means comprise a sheave 22 which cooperates with the roller 19, and a disc 23 which cooperates with the drive wheel 3. The sheave 22 and disc 23 are mounted on arms 24 and 25, respectively, pivotally attached to a vertically movable plate 26. Each of the arms 24 and 25 is resiliently positioned by means of tensioning units 27 and 28, respectively. Each of these units includes a plunger 29 actuated by a spring 31 held in place by a plug 32 secured to a cylinder forming the unit 27. The spring units exert a downward pressure on the rollers 22 and 23, while stops 33 and 34 limit the downward movement of the arms 24 and 25, respectively.

The plate 26 also supports a plow-shaped shoe 35 (Figs. 3 and 6) which is adapted to engage the inner periphery of the bead wire 2 to cause the wrapping material 4 to fold over the inner periphery of the bead wire. The shoe 35 is provided with slots 36 to permit vertical movement of the shoe, while a spring unit 37, similar to the unit 27, provides upward resiliency to the shoe. The shoe 35 lies in the path of the bead wire at the wrapping stage and lies above the bead wire which at this point is supported at its lower side by the auxiliary drive roller 18.

Following the wrapping stage as effected by the shoe 35, the bead wire passes into engagement with a wheel 38 (Fig. 7) freely rotatable about a shaft 39 secured to the plate 26. The wheel 38 is provided with a recess 41 for accommodating the bead wire. A flange 42 attached to the wheel 38 by means of machine screws 43 is resiliently positioned in respect thereto by means of springs 44 axially around the machine screws 43.

In cooperative engagement with the wheel 38 is a disc 45 pivotally mounted on an arm 46 attached to the frame 1 and adapted for resilient movement by means of a spring unit 47 similar to the spring unit 27. The disc 45 functions to press the under side of the bead wire into tight engagement with the recess formed in the wheel 38 positioned directly above the disc 45.

The plate 26 (Fig. 12) is adaptable for vertical movement to bring the various bead engaging rollers into and out of engagement with the bead 2. The plate 26 is attached to a housing 48 vertically slidable relative to rods 49 and 51 secured to the main part of the frame 1. A tie bar 52 is attached to the upper ends of the rods 49 and 51, and a vertically positioned air cylinder 53 is attached to the tie bar. A piston rod 54 is secured at one end to the housing 48 and at the other end to a piston 55 lying within the cylinder 53. A pipe line 56, connected to the upper end of the cylinder 53, permits introduction of air into the cylinder 53 for moving the plate 26 and its associated rollers downwardly and into engagement with the inner periphery of the bead 2. When the air is released from within the cylinder 53 by means hereinafter described, the housing 48 and the attached plate 26 is moved into its upper position by means of a counter-weight 57 connected to the housing 48 by means of a chain 58 extending around an idler sprocket 59 supported by a bracket 61 attached to the tie bar 52.

Guiding means are provided to hold the bead wire 2 in a vertical position during the wrapping operation. This guiding means includes a pair of rollers 62 and 63 (Fig. 12) attached to the tie bar 52 in a manner to provide an opening between the rollers 62 and 63 into which the bead wire may be inserted. The rollers 62 and 63 are of a sufficient length to provide adequate clearance for various size bead wires. An additional support for the bead wires is provided in the form of a pair of rollers 64 and 65 (Fig. 1) attached to an arm 66 fastened to the frame 1.

In order to actuate the cylinder 53 for moving the plate 26 vertically, I provide a foot pedal 67 (Fig. 10), located at the lower portion of the frame 1. The foot pedal is associated with a conventional air valve 68 connected to the cylinder 53 by means of the conduit 56. Also connected to the valve 68 is a conduit 69 which extends to a source of air pressure supply. In addition to operating the air valve 68, the foot pedal 67 also functions to actuate an electrical switch 71 for operating a motor 8. As the foot pedal 67 is moved into its downward position, a lug 72, extending from the side of the foot pedal 67, engages with a latch arm 73 which retains the foot pedal in its downward position. A secondary arm 74 extending at right angles from the latch arm 73 connects with a vertical connecting link 75 which joins with means hereinafter described for actuating the latch arm 73. A spring 76 connecting the arm 74 with the base 1 maintains the latch arm 73 and the foot pedal 67 in operating position. When the latch arm 73 is actuated by means hereinafter described, the foot pedal 67 is moved into an upward position, as shown by the dot and dash lines in Fig. 10, by a spring mechanism associated with the conventional valve 68, thus breaking the electrical contact to stop the motor 8, while simultaneously closing the valve 68 to permit the counter-weight 57 to move the plate 26 into its upward position.

The feed mechanism for advancing the strip material 4 toward the bead wire 2 is supported principally on a vertical plate 77 (Fig. 2) extending from the base 1. The stock supply roll 5 is rotatably positioned on a pin 78 extending from the plate 77. The stock 4 moves from the supply roll 5 and passes around a guide roller 79 extending from the plate 77 and thence around a pair of drive rollers 81 and 82 keyed to shafts 83 and 84, respectively.

Also keyed to the shaft 84 is a sprocket 85 (Fig. 1) which, through a chain 86, meshes with the sprocket 87 keyed to a counter-shaft 88. This counter-shaft is supported by bearings 89 attached to the main base 1. At the opposite end of the shaft 88 is a sprocket 91 which, through a chain 92, is driven from a sprocket 93 keyed to the main drive shaft 6. Also keyed to the shaft 84 which supports the drive roller 82 is a gear 94 which meshes with a gear 95 attached to the shaft 83 for driving the other drive roller 81 (Fig. 2). The two drive rollers 81 and 82 are, therefore, driven continuously through a series of sprockets, chains, and gears leading directly from the main drive shaft, and these drive rollers rotate continuously with the operation of the motor 8.

From the drive roller 82 the strip material 4 passes downward and around a roller 96 rotatably mounted on an arm 97 pivotally extending from a bracket 98 located on the floor upon which the machine rests. A stop bracket 99 limits the downward movement of the arm 97, while an electrical switch 101, fastened to the bracket 98, breaks the circuit leading to the motor 8 in the event the arm 97 is elevated to a point preventing the formation of a sufficient amount of stock into a free loop leading toward the bead wire. In ordinary operation of the apparatus, the switch 101 is not usually actuated as the speeds of the driving mechanism are synchronized so as to provide an adequate free loop of the stock in its respective position for the wrapping operation.

As the strip material 4 extends upwardly, it engages with a free running positioning roller 102 located on the plate 77, and around a measuring roller 103 keyed to a shaft 104 extending through the plate 77. At the opposite end of the measuring roller shaft 104 is a gear 105 (Fig. 1) which meshes with a larger gear 106 keyed to a secondary shaft 107 (Fig. 11). Also keyed to the secondary shaft is a cam 108 having a projection 109 engageable with a cam roller 111 attached to a pivotal arm 112. An adjustable machine screw 113 is associated with the arm 112 and is adapted to engage an electrical switch 114 for operating a solenoid coil hereinafter described. The measuring roller 103, therefore, functions to operate the cam 108 for the purpose of actuating a switch 114 for measuring a strip of fabric of a length sufficient to extend circumferentially around the bead wire and to provide a short over-lap.

A conventional electrical connection is provided between the switch 114 and a conventional solenoid coil 115, (Fig. 2). The solenoid coil includes an axially movable core 116 which connects with a link member 117 pivotally attached to a knife arm 118. The knife arm 118, in turn, is pivoted to the extension plate 77. A blade 119 (Fig. 3) is attached to the knife arm 118 and is cooperable with a shearing blade 121 attached to a bracket 122 extending from the blade 77. The strip material 4 passes horizontally between the blade 119 and the shearing blade 121, while actuation of the solenoid 115 causes the knife arm 118 to swing rapidly on its pivot, bringing the knife blade 119 and shearing blade 121 in complementary relation for transversely severing the strip material 4. A stop member to limit the upward movement of the knife blade 119 is provided in the form of a rubber bumper 123, positioned for engagement with the knife arm 118 and attached to the plate 77 by means of a bracket 124.

The length of time during which current is supplied to the solenoid coil 115 is relatively short and is determined by the circumferential length of the cam projection 109 (Fig. 11). The cam is sufficiently short that as soon as the fabric is severed by the knife blades, the current leading to the solenoid coil, as determined by the switch 114, is cut off, allowing the core 116 within the solenoid to drop to its original position by its own weight. As the solenoid core 116 returns to its original position, it stops the operation of the entire apparatus.

As shown in Fig. 2, the lower end of the solenoid core 116 engages with an arm 125 pivoted at an intermediate point to the main frame 1. The impact of the dropping movement of the core 116 results in an upward movement of the opposite end of the arm 125. This end of the arm 125 is pivotally connected with the connecting link 75. The movement of the arm 125 is, therefore, transmitted through the connecting link 75, arm 74, and latch arm 73 to cause the latch arm 73 to become disengaged with the lug 72 extending from the foot pedal 67. Being thus disconnected, the foot pedal 67 returns to its upward inactive position, thus cutting off the switch 71 to stop the motor 8 and actuating the valve mechanism 68 for cutting off the air supply to the cylinder 53. The valve 68 also opens the air line 56 to the atmosphere to permit the counter-weight 57 to move the plate 26 into its upward, inactive position, as shown in Fig. 3.

In starting the cycle of operation, it is necessary to first move the leading end of the strip material 4 into cooperative relationship with the bead wire 2. This is accomplished by means for advancing the strip material into engagement with the bead wire 2 at a point between the roller 19 and the sheave 22 (Figs. 3 and 4). As the strip material 4 leaves the measuring roller 103, it rests in a horizontal position upon a slidable plate 126 resting upon a bracket 127 attached to the plate 77. A slide-way 128 is provided in the bracket 127 which restricts the plate 126 to movement parallel with the length of strip material 4. A bracket 129 forming a continuation part with the plate 126 is provided with a surface which rests against the plate 77 and is slidably positioned therewith.

A stud 131 attached to the plate 129 extends through a slot 132 in the plate 77 and engages a hand-operated arm 133 pivotally attached to the plate 77. The stud 131 is loosely connected with the arm 133 through a slot 134 in the arm 133. Also mounted on the stud 131 is a pawl 135. This pawl is loosely pivoted on the stud 131 and its tip portion engages the top surface of the strip material as it rests on the plate 126 in such a manner that backward movement of the strip material is prevented. By this arrangement a movement of the hand lever causes the plate 126 carrying the leading end of the strip material 4 to be moved in the direction of the bead wire. Engagement of the pawl 135 with the fabric causes the fabric to be moved along with the plate 126. When the plate 126 is moved into this advanced position, the leading end of the strip material 4 is pressed tightly against the bead wire 2 when the bead wire is brought into operative position, and the adhesion therebetween causes the strip material to be carried with the bead wire in its circumferential movement. When the operator releases the hand lever 133, a counter-weight 136, attached to the bracket 129 by means of a chain 137 operating over an idler sprocket 138, returns the plate 126 to its normal position.

Means are also provided to stop the operation of the machine in the event the roll of stock 5 (Fig. 2) becomes diminished. This means is effected by an arm 139 pivoted to an extension 141 of the plate 77 and provided with a roller 142 which contacts with the stock roll 5. As the stock is withdrawn from the roll 5 to a point approaching the end of the material on the roll, the arm 139 engages a conventional electrical switch 143 which breaks the circuit leading to the motor 8, thus stopping operation of the machine. When a new supply roll 5 is being placed in the machine, it is necessary to move the arm 139 away from the diminished stock roll 5. To prevent operation of the motor due to actuation of the switch 143, an auxiliary foot switch 144 is provided which permits the operator to hold the motor out of operation. This allows the arm 139 to be moved into a new position as determined by a new roll 5 of strip material, without causing the motor to be operated. When the stock roll change is completed, the operator releases the foot switch 144 and operation of the machine is continued. This auxiliary means for stopping and starting the machine is essential in the event the stock roll becomes depleted while a bead wire is in the process of being wrapped.

When beginning operation of the apparatus, the plate 26 is in its upward position, as shown in Fig. 3, and the entire mechanism is in a state of rest. The operator grasps a bead wire from a source nearby and places the upper portion of the wire between the guide rollers 62 and 63. The lower portion of the bead wire is placed within the recess 11 (Fig. 5) formed by the drive wheel 3 and flange 12, while a side portion of the bead wire is located between guide rollers 64 and 65 (Fig. 1). At this time the hand lever 133 is moved to its advanced position so that the strip material 4 engages the bead wire 2. While the hand lever 133 is held in its advanced position, the operator depresses the foot pedal 67 which causes the plate 26 to move into its downward position, while the motor 8 is simultaneously caused to operate. Thereafter the operator releases the hand lever 133 and it is brought into its inoperative position by means of the counter-weight 136.

In the first step of the operation, as shown in Fig. 4, the strip material 4 rests upon the roller 19, and the bead wire 2 is located tangentially with respect to the strip material to permit them to be joined together in adhesive engagement. As the strip material reaches the drive wheel shown in Fig. 5, the recess 11 provided in the drive wheel 3, in cooperation with the laterally, resiliently mounted flange 12, causes the marginal portions of the strip material to be folded upwardly along the sides of the bead wire 2.

In the succeeding operation, the bead wire and the partially assembled strip material engage the auxiliary drive wheel 18 (Fig. 6) and the upwardly extending marginal portion of the strip material is folded down and on top of the inner periphery of the bead wire by means of the resiliently mounted, plow-shaped shoe 35. Thereafter the wrapped bead engages a disc 45 (Fig. 7) along its outer periphery, while the inner periphery of the bead and the side portions thereof are engaged by a recess formed by the wheel 38 and the laterally movable flange 42. This stage completes the wrapping operation and folds the remaining portion of the strip material laterally around the bead wire and in overlapping engagement with the opposite side portions of the strip material.

When the bead wire is almost entirely wrapped with the strip material, the measuring roller 103, through the operation of the cam 108, actuates the solenoid 115, thereby severing the strip material at a pre-determined period which will permit a circumferential over-lap of the wrapping material of approximately one-half inch. The impact of the return movement of the solenoid core 116 actuates the arm 125 which, in turn, releases the foot pedal 67 from its downwardly-held position. This release stops the motor and moves the plate 26 into its upward position out of engagement with the bead wire. The momentum of the moving parts is sufficient to carry the bead through the remaining wrapping operation after the cutting mechanism functions to stop the machine. The completely wrapped bead, in cross section, is shown in Fig. 8. The operator then removes the wrapped bead wire manually and a new bead wire is inserted in the machine which is now in position to repeat the cycle of operation.

By the arrangement and operation of the elements as thus described, it is possible to wrap bead wire with extreme rapidity, in combination with precision and uniformity. While I have thus shown and described a preferred embodiment of my invention, it is to be understood that it is susceptible of modifications, all of which I contemplate, which appear within the spirit of the invention and the scope of the appended claims.

Having thus shown and described my invention, what I claim and desire to protect by Letters Patent is:

1. An apparatus for wrapping tire beads comprising means for supporting a tire bead, means for driving the bead circumferentially, means for advancing a free end of a strip of wrapping material into engagement with the bead, and means for supplying a measured length of the wrapping material to the tire bead.

2. An apparatus for wrapping tire beads comprising means for supporting a tire bead, means for driving the bead circumferentially, means for advancing a free end of a strip of wrapping material into engagement with the bead, means for measuring a length of the wrapping material, and means actuated by the measuring means for severing the wrapping material.

3. An apparatus for wrapping tire beads comprising means for supporting a tire bead, means for driving the bead circumferentially, means for advancing a strip of wrapping material into engagement with the bead, means for measuring a length of the wrapping material, means actuated by the measuring means for severing the wrapping material, and means actuated by the severing means for stopping the driving means.

4. An apparatus for wrapping tire beads comprising means for supporting a tire bead, means for advancing a strip of wrapping material into engagement with a sheave for driving the bead and applied strip circumferentially, one of the flanges of said sheave being laterally resilient, a vertically movable and resiliently mounted wheel adapted to press the bead into engagement with the sheave, and means for supplying a measured length of the wrapping material to the tire bead.

5. An apparatus for wrapping tire beads comprising means for supporting a tire bead including a plurality of rollers, at least one roller being a bead drive roller, a vertically movable plate, a plurality of rollers mounted on the plate and engageable with the inner periphery of the bead, means for advancing a strip of wrapping material into engagement with the bead, said groups of rollers being cooperable for moving the circumferential marginal portions of the wrapping material laterally around the bead, and means for supplying a measured length of the wrapping material to the tire bead.

6. An apparatus for wrapping tire beads comprising means for supporting a tire bead including a plurality of rollers, at least one roller being a bead drive roller, a vertically movable plate, a plurality of rollers mounted on the plate and engageable with the inner periphery of the bead, means for advancing a strip of wrapping material into engagement with the bead, said groups of rollers being cooperable for moving the circumferential marginal portions of the wrapping material laterally around the bead, means for measuring a length of the wrapping material, and means actuated by the measuring means for severing the wrapping material.

7. An apparatus for wrapping tire beads comprising means for supporting a tire bead including a plurality of rollers, at least one roller being a bead drive roller, a vertically movable plate, a plurality of rollers mounted on the plate and engageable with the inner periphery of the bead, means for advancing a strip of wrapping material into engagement with the bead, said groups of rollers being cooperable for moving the circumferential marginal portions of the wrapping material laterally around the bead, means for measuring a length of the wrapping material, means actuated by the measuring means for severing the wrapping material, and means actuated by the severing means for stopping the driving means.

8. An apparatus for wrapping tire beads comprising means for supporting a tire bead including a plurality of rollers, at least one roller being a bead drive roller, a vertically movable plate, a plurality of rollers mounted on the plate and engageable with the inner periphery of the bead, means for advancing a strip of wrapping material into engagement with the bead, said groups of rollers being cooperable for moving the circumferential marginal portions of the wrapping material laterally around the bead, means for measuring a length of the wrapping material, means actuated by the measuring means for severing the wrapping material, means actuated by the severing means for stopping the driving means and for moving the plate and its associated rollers out of engagement with the inner periphery of the bead.

9. An apparatus for wrapping tire beads comprising means for supporting a tire bead including a plurality of rollers, at least one roller being a bead drive roller, a vertically movable plate, a plurality of rollers mounted on the plate and engageable with the inner periphery of the bead, means for advancing a strip of wrapping material into engagement with the bead, said groups of rollers being cooperable for moving the circumferential marginal portions of the wrapping material laterally around the bead, a shoe attached to the plate in a vertically resilient manner and adapted to engage the inner periphery of the bead for assisting in moving the wrapping material around the bead, and means for supplying a measured length of the wrapping material to the tire bead.

10. An apparatus for wrapping tire beads comprising means for supporting a tire bead, means for driving the bead circumferentially, means for advancing a strip of wrapping material into engagement with the bead, a measuring roll driven by the strip of wrapping material, a cam associated with the measuring roll, an electrical switch operable by the cam, a knife blade movable in the path of the wrapping material, and a solenoid coil connected with the knife blade and actuated by said switch to sever the wrapping material.

11. An apparatus for wrapping tire beads comprising means for supporting a tire bead, means for driving the bead circumferentially, means for advancing a strip of wrapping material into engagement with the bead, a measuring roll driven by the strip of wrapping material, a cam associated with the measuring roll, an electrical switch operable by the cam, a knife blade movable in the path of the wrapping material, a solenoid coil connected with the knife blade and actuated by said switch to sever the wrapping material, and means actuated by the severing means for stopping the driving means.

12. An apparatus for wrapping tire beads comprising means for supporting a tire bead, means for driving the bead circumferentially, a supply roll of strip wrapping material, a pair of drive rolls for removing the strip material from the supply roll, means for supplying a measured length of the wrapping material to the tire bead, and automatic means for stopping the machine upon a predetermined diminution in size of the supply roll.

13. An apparatus for wrapping tire beads comprising means for supporting a tire bead, means for driving the bead circumferentially, a supply roll of strip wrapping material, a pair of drive rolls for removing the strip material from the supply roll, means for supplying a measured length of the wrapping material to the tire bead, automatic means for stopping the machine upon a predetermined diminution in size of the supply roll, and additional means for preventing operation of the machine during replacement of the supply roll.

14. An apparatus for wrapping tire beads comprising means for supporting a tire bead, means for driving the bead circumferentially, means for advancing a strip of wrapping material into engagement with the bead, means for measuring a length of the wrapping material, means actuated by the measuring means for severing the wrapping material, a foot pedal adapted to set the machine in operation, a latch cooperable with the foot pedal maintaining it in operating position, and means actuated by the severing means for releasing the foot pedal latch.

15. In a bead wrapping machine, a plurality of supporting, forming and moving rollers for a bead, a source of wrapping material, means for severing predetermined lengths of wrapping material, means for holding a leading free end of the wrapping material, and means including said holding means for advancing the free end of the wrapping material into engagement with the bead for movement therewith between groups of said rollers.

CHARLES H. DESAUTELS.